(12) United States Patent
Kim et al.

(10) Patent No.: US 11,914,118 B2
(45) Date of Patent: Feb. 27, 2024

(54) OPTICAL IMAGING SYSTEM

(71) Applicant: Samsung Electro-Mechanics Co., Ltd., Suwon-si (KR)

(72) Inventors: Hag Chul Kim, Suwon-si (KR); Phil Ho Jung, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/881,072

(22) Filed: Aug. 4, 2022

(65) Prior Publication Data

US 2022/0382025 A1 Dec. 1, 2022

Related U.S. Application Data

(63) Continuation of application No. 17/212,229, filed on Mar. 25, 2021.

(30) Foreign Application Priority Data

Dec. 23, 2020 (KR) .......................... 10-2020-0181646

(51) Int. Cl.
*G02B 13/00* (2006.01)
*G02B 9/12* (2006.01)
*G03B 17/17* (2021.01)
*G02B 15/14* (2006.01)

(52) U.S. Cl.
CPC .......... *G02B 13/0065* (2013.01); *G02B 9/12* (2013.01); *G02B 13/009* (2013.01); *G02B 13/0045* (2013.01); *G02B 15/143* (2019.08); *G02B 15/1435* (2019.08); *G02B 15/143503* (2019.08); *G03B 17/17* (2013.01)

(58) Field of Classification Search
CPC ............ G02B 13/0065; G02B 13/0045; G02B 13/009; G02B 15/143; G02B 15/1435; G02B 15/143503
See application file for complete search history.

(56) References Cited

U.S. PATENT DOCUMENTS

| | | |
|---|---|---|
| 5,253,114 A | 10/1993 | Lee et al. |
| 5,461,512 A | 10/1995 | Ruben |
| 5,539,582 A | 7/1996 | Kohno et al. |

(Continued)

FOREIGN PATENT DOCUMENTS

| | | |
|---|---|---|
| CN | 106154488 A | 11/2016 |
| CN | 110389423 A | 10/2019 |

(Continued)

OTHER PUBLICATIONS

Non-Final Office Action dated Jan. 6, 2023, in related U.S. Appl. No. 17/212,229 (24 pages in English).

(Continued)

*Primary Examiner* — Cara E Rakowski
(74) *Attorney, Agent, or Firm* — NSIP Law

(57) ABSTRACT

An optical imaging system includes a first lens group, a second lens group, and a third lens group, sequentially arranged from an object side, wherein the first lens group includes two lenses having negative and positive refractive power, the second lens group includes a plurality of lenses, and the third lens group includes two lenses having negative and positive refractive power.

18 Claims, 10 Drawing Sheets

(56) References Cited

U.S. PATENT DOCUMENTS

| | | |
|---|---|---|
| 5,666,232 A | 9/1997 | Toyama |
| 5,966,247 A | 10/1999 | Goosey et al. |
| 6,101,045 A | 8/2000 | Konno et al. |
| 6,324,017 B1 | 11/2001 | Enomoto |
| 6,353,507 B1 | 3/2002 | Enomoto |
| 2002/0141073 A1 | 10/2002 | Enomoto |
| 2002/0154908 A1 | 10/2002 | Itoh |
| 2003/0197948 A1 | 10/2003 | Eguchi |
| 2005/0270400 A1 | 12/2005 | Ito |
| 2006/0245078 A1 | 11/2006 | Kawamura |
| 2007/0201142 A1* | 8/2007 | Narikawa ...... G02B 15/143503 359/680 |
| 2008/0106800 A1 | 5/2008 | Shin |
| 2009/0097132 A1 | 4/2009 | Katakura |
| 2013/0335605 A1 | 12/2013 | Kuo |
| 2016/0109687 A1 | 4/2016 | Son |
| 2016/0147050 A1 | 5/2016 | Fujikura et al. |
| 2018/0074298 A1 | 3/2018 | Jung et al. |
| 2019/0086638 A1* | 3/2019 | Lee .................. G02B 13/0045 |
| 2019/0324236 A1 | 10/2019 | Kim et al. |
| 2020/0355889 A1* | 11/2020 | Hayashi ............ G02B 13/0045 |
| 2020/0386972 A1 | 12/2020 | Chen |
| 2021/0063702 A1 | 3/2021 | Kim et al. |
| 2022/0113491 A1* | 4/2022 | Shim ................ G02B 13/0045 |
| 2022/0269048 A1* | 8/2022 | Lee ................ G02B 15/143503 |

FOREIGN PATENT DOCUMENTS

| | | |
|---|---|---|
| CN | 209911625 U | 1/2020 |
| DE | 9302014 U1 | 6/1993 |
| DE | 10108936 A1 | 9/2001 |
| JP | H05-173074 A | 7/1993 |
| JP | 2007-79326 A | 3/2007 |
| JP | 2012-27502 A | 2/2012 |
| JP | 2020-187181 A | 11/2020 |
| KR | 2002-0053758 A | 7/2002 |
| KR | 10-2003-0018756 A | 3/2003 |
| KR | 10-2007-0122018 A | 12/2007 |
| KR | 10-2018-0029815 A | 3/2018 |
| KR | 10-2019-0032905 A | 3/2019 |

OTHER PUBLICATIONS

U.S. Appl. No. 17/212,229, filed Mar. 25, 2021, Hag Chul Kim et al., Samsung Electro-Mechanics Co., Ltd.

Chinese Office Action dated Dec. 8, 2022, in counterpart Chinese Patent Application No. 202210423903.5 (9 pages in English, 10 pages in Chinese).

Korean Office Action dated Oct. 13, 2022, in counterpart Korean Patent Application No. 10-2020-0181646 (10 pages in English, 7 pages in Korean).

Korean Office Action dated Oct. 13, 2022, in counterpart Korean Patent Application No. 10-2022-0096549 (7 pages in English, 5 pages in Korean).

Chinese Office Action dated Sep. 26, 2022, in counterpart Chinese Patent Application No. 202110823575.3 (9 Pages in English, 11 Pages in Chinese).

Taiwanese Office Action dated Feb. 24, 2022, in counterpart Taiwanese Patent Application No. 110112135 (6 pages in English and 8 pages in Mandarin).

* cited by examiner

OPTICAL IMAGING SYSTEM

CROSS-REFERENCE TO RELATED APPLICATIONS

This application is a continuation of U.S. patent application Ser. No. 17/212,229 filed on Mar. 25, 2021, which claims the benefit under 35 USC 119(a) of Korean Patent Application No. 10-2020-0181646 filed on Dec. 23, 2020, in the Korean Intellectual Property Office, the entire disclosure of which is incorporated herein by reference for all purposes.

BACKGROUND

1. Field

The present disclosure relates to an optical imaging system configured to enable adjustment of focusing magnification.

2. Description of the Background

In a collapsible optical system in which a plurality of lenses are arranged in a row, as the number of lenses is increased, an overall length of the optical system is increased. For example, it is more difficult to miniaturize an optical imaging system including five lenses than to miniaturize an optical imaging system including three lenses. For this reason, there is a limit to mounting a collapsible optical system having a long focal length in a thin portable terminal.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group, a second lens group, and a third lens group, sequentially arranged from an object side. The first lens group includes two lenses having negative and positive refractive power, the second lens group includes a plurality of lenses, and the third lens group includes two lenses having negative and positive refractive power.

The first to third lens groups may include seven lenses having refractive power.

The second lens group may be configured such that an optical axis distance from the first lens group is variable.

The third lens group may be configured such that an optical axis distance from the second lens group is variable.

The optical imaging system may further include an optical path folding element disposed on the object side of the first lens group.

A ratio TTL/fw between a distance TTL from an object-side surface of the frontmost lens of the first lens group to an imaging plane of the optical imaging system and a focal length fw of the optical imaging system at a wide-angle end may be 2.0 to 3.0.

A ratio TTL/ft between a distance TTL from an object-side surface of the frontmost lens of the first lens group to an imaging plane of the optical imaging system and a focal length ft of the optical imaging system at a telephoto end may be 0.8 to 1.2.

A portable terminal may include the optical imaging system disposed on one or both of a rear surface and a front surface of the portable terminal, and an image sensor disposed at an image plane of the optical imaging system.

In another general aspect, an optical imaging system includes a first lens group including a first lens having negative refractive power and a second lens having positive refractive power, a second lens group including a third lens, a fourth lens, and a fifth lens, and a third lens group including a sixth lens having positive refractive power and a seventh lens having negative refractive power. The first lens group to the third lens group are sequentially arranged from an object side, and the second lens group and the third lens group are configured to be movable in an optical axis direction to enable adjustment of focusing magnification.

The first lens may have an object-side surface having a concave shape.

The fifth lens may have an image-side surface having a concave shape.

The sixth lens may have an object-side surface having a concave shape.

The seventh lens may have an object-side surface having a concave shape.

The seventh lens may have an image-side surface having a concave shape.

The third lens may have positive refractive power.

The fourth lens may have positive refractive power.

The optical imaging system may further include an optical path folding element disposed on the object side of the first lens.

In another general aspect, an optical imaging system includes a first lens group having a first lens and a second lens, a second lens group movable along an optical axis of the optical imaging system with respect to the first lens group, and having a third lens, a fourth lens, and a fifth lens, a third lens group movable along the optical axis with respect to the second lens group, and including a sixth lens having positive refractive power and a seventh lens having negative refractive power, wherein the first lens, the second lens, the third lens, the fourth lens, the fifth lens, the sixth lens, and the seventh lens are disposed in sequential order from the object side.

A portable terminal may include one or more optical imaging systems including the optical imaging system disposed on one or both of a rear surface and a front surface of the portable terminal, wherein the one or more optical imaging systems each comprise an image sensor disposed at an image plane thereof.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
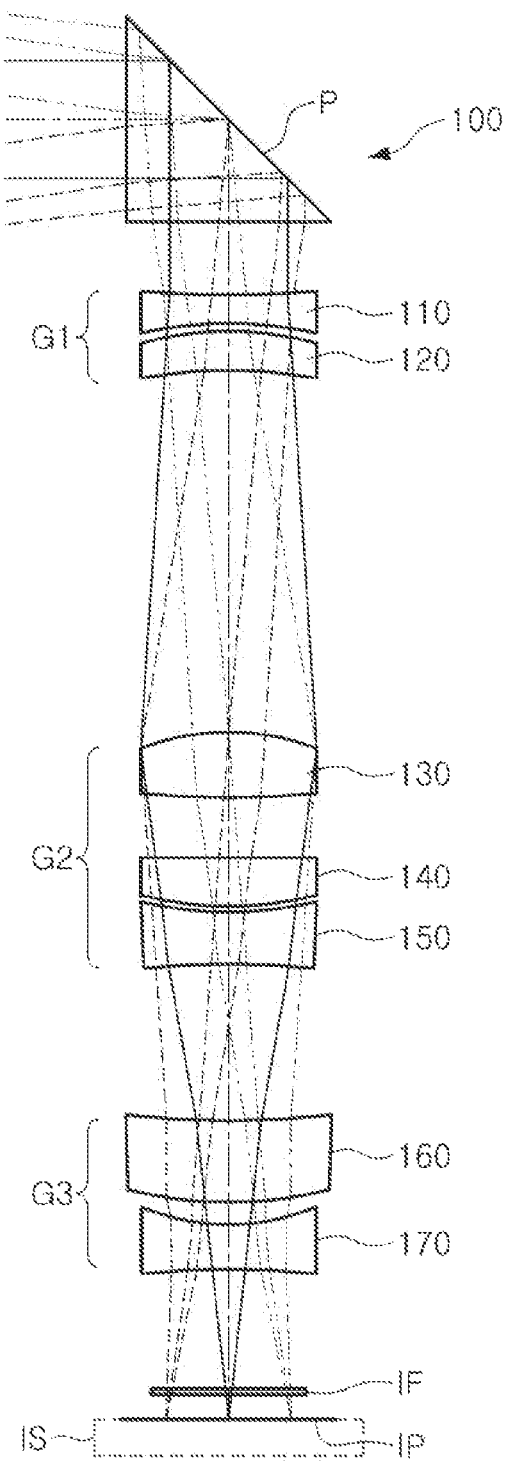
FIGS. 1 and 2 are views illustrating an optical imaging system according to a first example embodiment in the present disclosure.

Hereinafter, while example embodiments of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

In addition, in the present specification, a first lens refers to a lens closest to an object (or a subject), while a seventh lens refers to a lens closest to an imaging plane (or an image sensor). In addition, all of radii of curvature and thicknesses of lenses, a distance along the optical axis from the object-side surface of the first lens to the imaging plane (TTL), a half of a diagonal length of an imaging plane (IMG HT), and focal lengths of the lenses are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex. In the present specification, the imaging plane may mean an image forming surface on which a lens is focused or one surface of an image sensor.

An optical imaging system may include an optical system including a plurality of lenses. For example, the optical system of the optical imaging system may include a plurality of lenses having refractive power. However, the optical imaging system is not limited to including only the lenses having the refractive power. For example, the optical imaging system may include a prism for refracting incident light and a stop for adjusting an amount of light. In addition, the optical imaging system may further include an infrared cut-off filter for blocking infrared light.

The lenses may be formed of a material having a refractive index different from that of air. For example, the plurality of lenses may be formed of plastic or glass. At least one of the plurality of lenses may have an aspherical shape. For example, either one or both of the object-side surface and the image-side surface of at least one of the lenses may be aspherical. Each aspherical surface may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Equation 1

Here, c is an inverse of a radius of curvature of the lens, k is a conic constant, r is a distance from a certain point on an aspherical surface of the lens to an optical axis, A to H, and J are aspherical constants, and Z (or SAG) is a distance between the certain point on the aspherical surface of the lens at the distance r and a tangential plane meeting the apex of the aspherical surface of the lens.

An aspect of the present disclosure may provide an optical imaging system having a long focal length and for mounting in a thinned small terminal.

The optical imaging system may include a plurality of lens groups. For example, the optical imaging system may include a first lens group, a second lens group, and a third lens group. The first lens group, the second lens group, and the third lens group may be sequentially arranged from an object side. The optical imaging system may include a plurality of lenses. For example, the first to third lens groups may include seven lenses.

The first lens group may include a plurality of lenses. For example, the first lens group may include two lenses having negative and positive refractive power. For example, the first lens group may include a first lens having negative refractive power and a second lens having positive refractive power. The first lens group may be configured to maintain a constant distance to the imaging plane. For example, a distance from an image-side surface of the uppermost lens (disposed closest to the object side, also known as the first lens) of the first lens group to the imaging surface may be kept constant irrespective of focus adjustment and focusing magnification adjustment. The first lens group may include a lens having a concave surface. For example, an object-side surface of the first lens may be concave.

The second lens group may include a plurality of lenses. For example, the second lens group may include a third lens, a fourth lens, and a fifth lens that are sequentially arranged from the object side. The second lens group may be configured to move along an optical axis. For example, the second lens group may be configured such that an optical axis distance from the first lens group is variable. The second lens group may include a lens having a concave surface. For example, an image-side surface of the fifth lens may be concave. The second lens group may include a lens having positive refractive power. As an example, the third lens may have positive refractive power. As another example, the fourth lens may have positive refractive power.

The third lens group may include a plurality of lenses. For example, the third lens group may include two lenses having negative and positive refractive power. As an example, the third lens group may include a sixth lens having positive refractive power and a seventh lens having negative refractive power. The third lens group may be configured to move along an optical axis. For example, the third lens group may be configured such that an optical axis distance from the second lens group is variable. The third lens group may include a lens having a concave surface. As an example, an object-side surface of the sixth lens may be concave. As another example, an object-side surface of the seventh lens may be concave. As another example, an image-side surface of the seventh lens may be concave.

The second lens group and the third lens group may be simultaneously moved in an optical axis direction. As an example, the second lens group and the third lens group may move in a direction toward an imaging plane (an imaging plane direction) to enable short-range imaging of the optical imaging system (wide-angle imaging). As another example, the second lens group and the third lens group may move in a direction toward the first lens group (a first lens group direction) to enable long-distance imaging of the optical imaging system (telephoto imaging).

The optical imaging system may further include an optical path folding element. For example, the optical imaging system may further include optical path folding element such as a prism or a reflector disposed on the object side of the first lens group.

The optical imaging system includes a plastic lens. For example, in the optical imaging system, at least one of seven or more lenses constituting the lens groups may be made of a plastic material. The optical imaging system may include an aspherical lens (either one or both of the object-side surface and the image-side surface of the aspherical lens may be aspherical). For example, in the optical imaging system, at least one of seven or more lenses constituting the lens groups may be an aspherical lens.

The optical imaging system may further include a filter, a stop, and an image plane.

The filter may be disposed between the third lens group and an image sensor. The filter may block light of a specific wavelength included in the incident light. For example, the filter may be configured to block an infrared wavelength of light. The stop may be configured to adjust an amount of light incident to the lens group. For example, the stop may be disposed on the object side of the first lens group or between the first lens group and the second lens group to adjust an amount of light incident to the first lens group or the second lens group. The imaging plane may be formed at a point where an image formed by the lenses is formed. For example, the imaging plane may be formed on one surface or an inner surface of the image sensor.

The optical imaging system may satisfy one or more of the following Conditional Expressions:

$-1.2 < fw/f1 < -0.6$ $0.1 < fw/f2 < 0.4$ $1.0 < fw/f3 < 3.0$ $0.6 < fw/f4 < 1.2$ $-1.2 < fw/f5 < -0.6$ $0.2 < fw/f6 < 0.6$ $-2.0<fw/f7<-1.0$ $2.0<ft/fw<3.0$

In the Conditional Expressions, fw is a focal length of the optical imaging system at a wide-angle end, ft is a focal length of the optical imaging system at a telephoto end, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens.

The optical imaging system may further satisfy one or more of the following Conditional Expressions:

$-3.0<ft/f1<-1.0$ $0.3<ft/f2<1.0$ $2.0<ft/f3<6.0$ $1.0<ft/f4<4.0$ $-3.0<ft/f5<-1.0$ $0.6<ft/f6<1.6$ $-4.0<ft/f7<-2.0$

The optical imaging system may further satisfy one or more of the following Conditional Expressions:

$1.40<Nd3<1.50$ $0.10<Nd2-Nd3<0.20$ $0<Nd6-Nd5<0.04$ $0<Nd6-Nd7<0.20$ $2.0<TTL/fw<3.0$ $0.8<TTL/ft<1.2$ $8.0<TTL/IMG\_HT<12.0$ $3.6<fw/IMG\_HT<4.6$ $8.0<ft/IMG\_HT<12.0$ $2.0<PTTL/fw<3.0$ $0.8<PTTL/ft<1.4$

In the Conditional Expressions, Nd2 is a refractive index of the second lens, Nd3 is a refractive index of the third lens, Nd5 is a refractive index of the fifth lens, Nd6 is a refractive index of the sixth lens, Nd7 is a refractive index of the seventh lens, TTL is a distance from an object-side surface of the frontmost lens (first lens) of the first lens group to the imaging plane, IMG_HT is a height of the imaging plane (½ of a diagonal length), and PTTL is a distance from a reflective surface of the optical path folding element to the imaging plane.

Hereinafter, example embodiments in the present disclosure will be described in detail with reference to the accompanying drawings.

Figure 2:
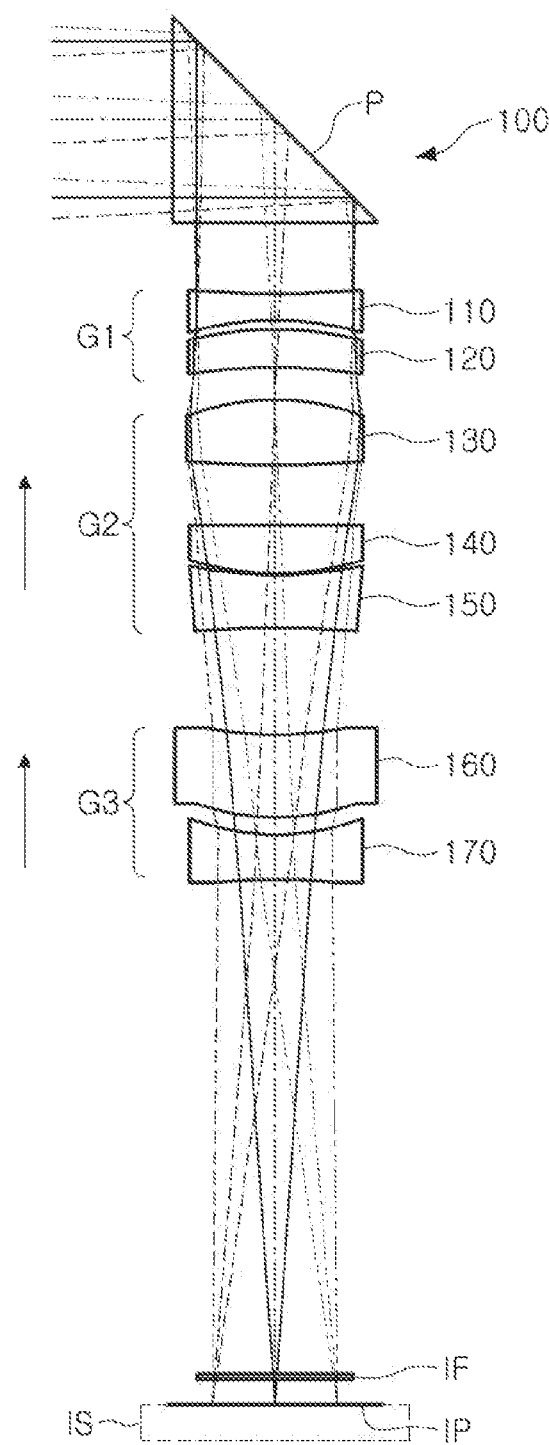

An optical imaging system according to a first example embodiment will be described with reference to FIGS. 1 and 2.

An optical imaging system 100 may include a plurality of lens groups. For example, the optical imaging system 100 may include a first lens group G1, a second lens group G2, and a third lens group G3. The optical imaging system 100 may include a plurality of lenses. For example, the optical imaging system 100 may include a first lens 110, a second lens 120, a third lens 130, a fourth lens 140, a fifth lens 150, a sixth lens 160, and a seventh lens 170 that are sequentially disposed from an object side.

The first lens group G1 may include two lenses. For example, the first lens group G1 may include the first lens 110 and the second lens 120. The first lens 110 may have negative refractive power, and an object-side surface thereof may be concave and an image-side surface thereof may be concave. The second lens 120 may have positive refractive power, and an object-side surface thereof may be convex and an image-side surface thereof may be concave.

The second lens group G2 may include three lenses. For example, the second lens group G2 may include the third lens 130, the fourth lens 140, and the fifth lens 150. The third lens 130 may have positive refractive power, and an object-side surface thereof may be convex and an image-side surface thereof may be convex. The fourth lens 140 may have positive refractive power, and an object-side surface thereof may be convex and an image-side surface thereof may be convex. The fifth lens 150 may have negative refractive power, and an object-side surface thereof may be concave and an image-side surface thereof may be convex.

The third lens group G3 may include two lenses. For example, the third lens group G3 may include the sixth lens 160 and the seventh lens 170. The sixth lens 160 may have positive refractive power, and an object-side surface thereof may be concave and an image-side surface thereof may be convex. The seventh lens 170 may have negative refractive power, and an object-side surface thereof may be concave and an image-side surface thereof may be concave.

Figure 3:
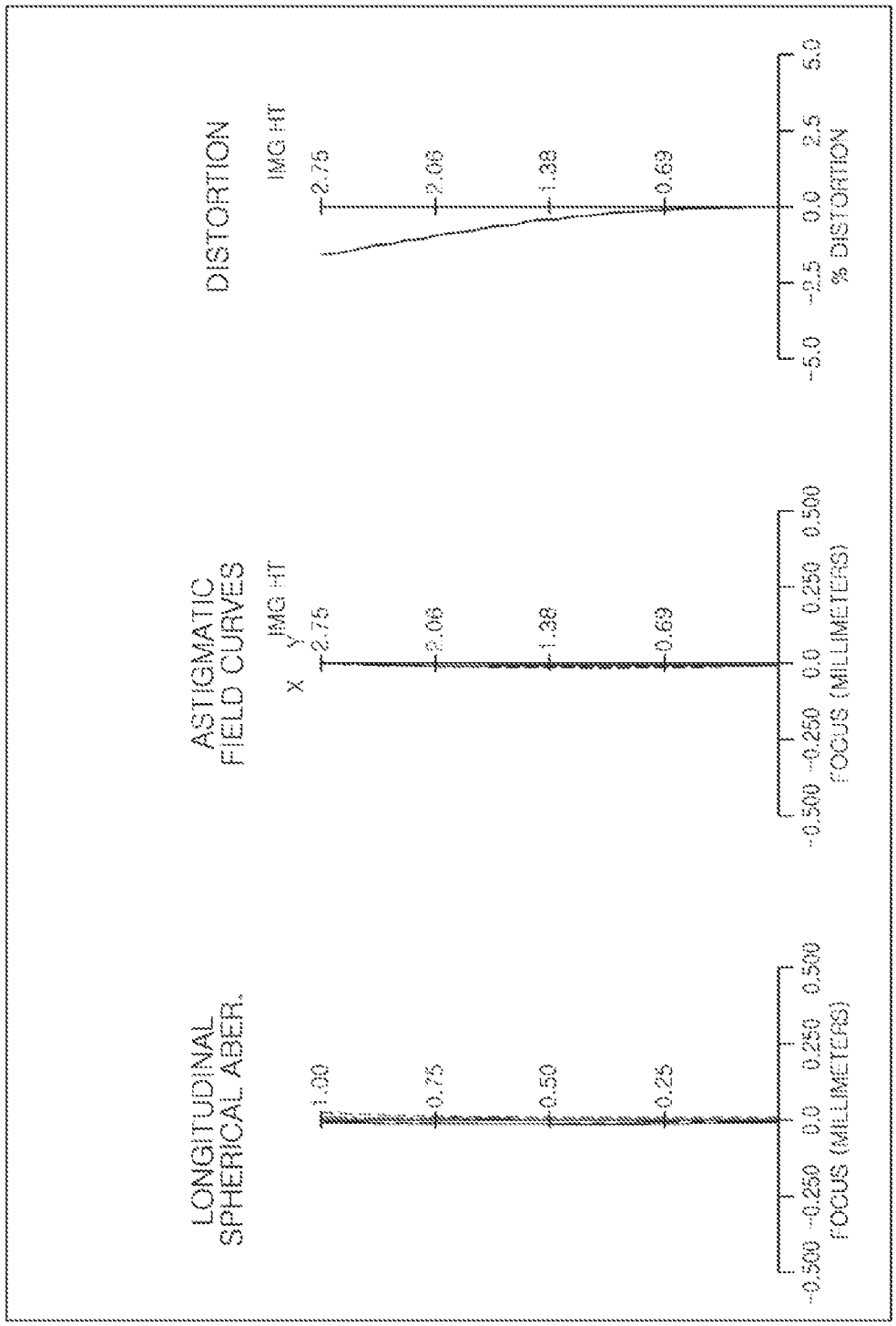
FIGS. 3 and 4 are graphs having curves representing aberration characteristics of the optical imaging system illustrated in FIGS. 1 and 2, respectively.
Figure 4:
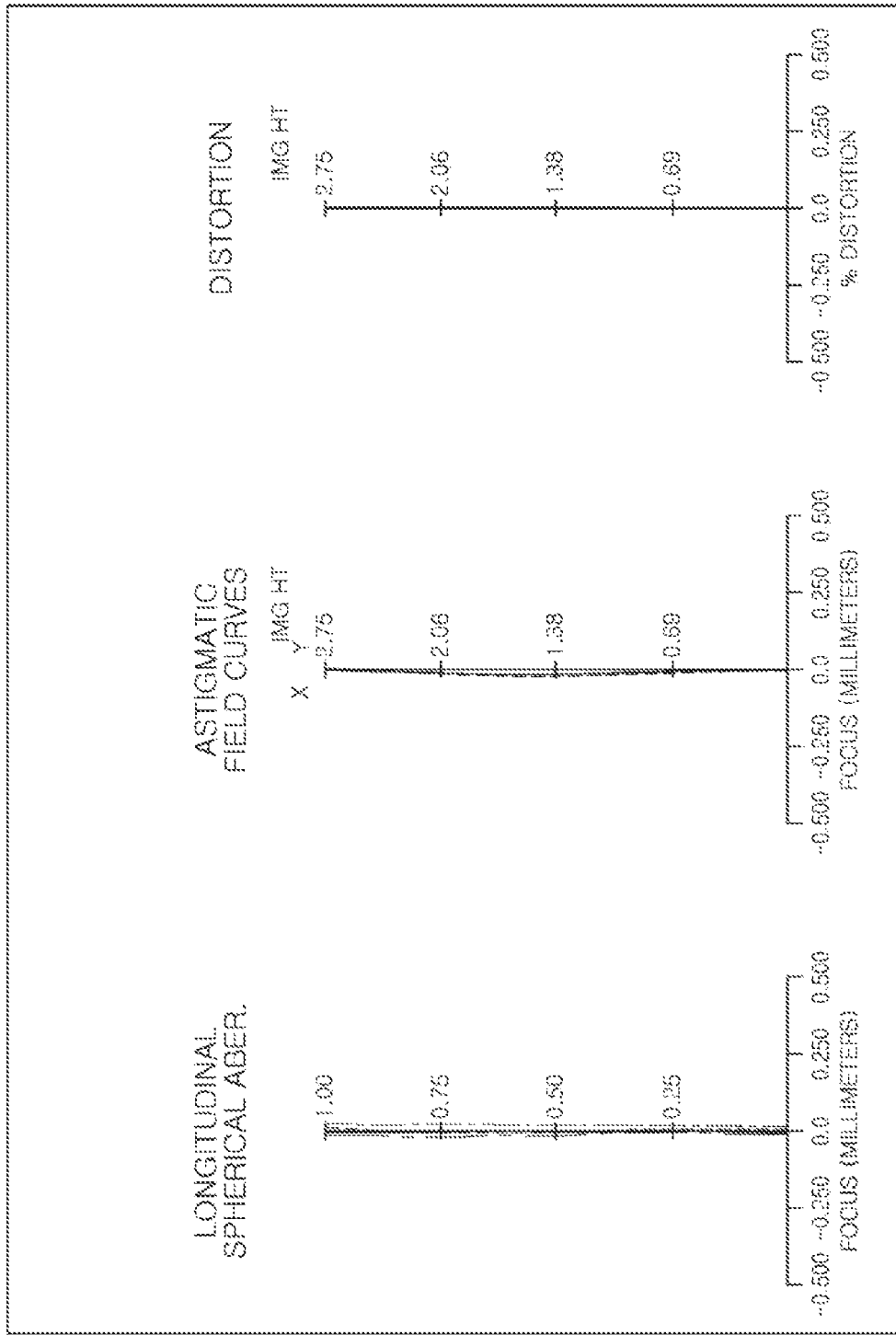

The lens groups G1, G2, and G3 may be moved along the optical axis direction so as to change focusing magnification of the optical imaging system. As an example, an optical axis distance between the first lens group G1 and the second lens group G2 and an optical axis distance between the second lens group G2 and the third lens group G3 may increase as the focal magnification of the optical imaging system decreases (see FIG. 1). As another example, the optical axis distance between the first lens group G1 and the second lens group G2 and the optical axis distance between the second lens group G2 and the third lens group G3 may decrease as the focal magnification of the optical imaging system increases (see FIG. 2). FIGS. 3 and 4 are graphs having curves representing aberration characteristics of the optical imaging system 100 according to the wide-angle end and the telephoto end, respectively.

The optical imaging system 100 may further include a prism P, a filter IF, and an imaging plane IP.

The prism P may be disposed on the object side of the first lens 110. The prism P may be configured to refract or reflect a path of light incident on the optical imaging system 100. The filter IF may be disposed in front of the imaging plane IP to block infrared rays included in the incident light. The imaging plane IP may provide a space in which light refracted by the first to seventh lenses 110 to 170 forms an image. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Table 1 represents characteristics of lenses of the optical imaging system according to the present example embodiment, and Table 2 represents aspherical values of the optical imaging system according to the present example embodiment.

TABLE 1

| Surface No. | Remark | Radius of Curvature | Thickness/ Distance (Wide-Angle End) | Thickness/ Distance (Telephoto End) | Refractive Index | Abbe Number |
|---|---|---|---|---|---|---|
| 1 | Prism | Infinity | 2.5000 | 2.5000 | 1.717 | 29.5 |
| 2 |  | Infinity | 2.5000 | 2.5000 | 1.717 | 29.5 |
| 3 |  | Infinity | 1.8000 | 1.8000 |  |  |
| 4 | First Lens | −46.4043 | 0.7000 | 0.7000 | 1.544 | 56 |
| 5 |  | 9.0421 | 0.2200 | 0.2200 |  |  |
| 6 | Second Lens | 8.8400 | 0.9500 | 0.9500 | 1.651 | 21.5 |
| 7 |  | 12.8335 | 8.8484 | 0.7500 |  |  |
| 8 | Third Lens | 5.4399 | 1.6499 | 1.6499 | 1.497 | 81.5 |
| 9 |  | −24.9406 | 1.4756 | 1.4756 |  |  |
| 10 | Fourth Lens | 108.7313 | 1.1948 | 1.1948 | 1.544 | 56 |
| 11 |  | −7.9452 | 0.0830 | 0.0830 |  |  |
| 12 | Fifth Lens | −8.4642 | 1.3500 | 1.3500 | 1.635 | 23.9 |
| 13 |  | −99.7980 | 3.7985 | 2.5816 |  |  |
| 14 | Sixth Lens | −9.4446 | 2.0500 | 2.0500 | 1.651 | 21.5 |
| 15 |  | −6.0670 | 0.4643 | 0.4643 |  |  |
| 16 | Seventh Lens | −8.4886 | 1.1654 | 1.1654 | 1.544 | 56 |
| 17 |  | 11.5897 | 2.9447 | 12.2600 |  |  |
| 18 | Filter | Infinity | 0.1100 | 0.1100 | 1.516 | 64.1 |
| 19 |  | Infinity | 0.5927 | 0.5927 |  |  |
| 20 | Imaging plane | Infinity | 0.0000 | 0.0000 |  |  |

TABLE 2

| Surface No. | 4 | 5 | 6 | 7 | 8 | 9 | 10 |
|---|---|---|---|---|---|---|---|
| K | 0 | −0.7497077 | 0.22643401 | 0.22909475 | −0.0723638 | −72.164313 | 99 |
| 4-th Order Coefficient | 2.318E−04 | −1.088E−04 | 7.033E−04 | 9.206E−04 | 5.356E−04 | 6.696E−04 | 6.944E−04 |
| 6-th Order Coefficient | 3.858E−05 | 5.257E−05 | 3.116E−05 | 7.860E−06 | 1.862E−05 | −1.432E−05 | 3.961E−05 |
| 8-th Order Coefficient | −1.116E−07 | 3.403E−06 | −2.592E−06 | −2.234E−06 | 2.904E−06 | 8.810E−08 | −4.269E−06 |
| 10-th Order Coefficient | −6.724E−09 | −2.387E−07 | −2.092E−07 | −4.594E−07 | −2.957E−08 | 2.624E−07 | −2.046E−06 |
| 12-th Order Coefficient | −8.829E−09 | −1.480E−08 | 1.462E−08 | 3.355E−08 | 3.620E−09 | −1.655E−08 | 1.996E−07 |
| 14-th Order Coefficient | 0 | 0 | 0 | 6.324E−10 | 0 | 0 | 0 |
| 16-th Order Coefficient | 0 | 0 | 0 | 0 | 0 | 0 | 0 |
| 18-th Order Coefficient | 0 | 0 | 0 | 0 | 0 | 0 | 0 |
| 20-th Order Coefficient | 0 | 0 | 0 | 0 | 0 | 0 | 0 |

| Surface No. | 11 | 12 | 13 | 14 | 15 | 16 | 17 |
|---|---|---|---|---|---|---|---|
| K | −4.5366504 | −6.3081625 | −99 | −24.032713 | −13.171581 | −74.023982 | −8.669208 |
| 4-th Order Coefficient | 5.881E−06 | −1.300E−03 | −2.356E−03 | −1.635E−04 | 4.309E−03 | 2.721E−02 | 1.172E−02 |
| 6-th Order Coefficient | 9.421E−05 | −1.864E−05 | −1.080E−04 | −8.675E−04 | −3.943E−03 | −1.501E−02 | −4.416E−03 |
| 8-th Order Coefficient | −2.891E−06 | 6.161E−06 | −9.053E−06 | 1.030E−03 | 4.891 E−03 | 1.432E−02 | 3.703E−03 |
| 10-th Order Coefficient | −2.606E−06 | 6.197E−07 | 5.744E−06 | −9.098E−04 | −3.843E−03 | −1.040E−02 | −2.466E−03 |
| 12-th Order Coefficient | 1.997E−07 | −2.713E−07 | −7.258E−07 | 5.101E−04 | 1.851E−03 | 4.917E−03 | 1.032E−03 |

TABLE 2-continued

| | | | | | | |
|---|---|---|---|---|---|---|
| 14-th Order Coefficient | 0 | 0 | −1.639E−08 | −1.773E−04 | −5.508E−04 | −1.472E−03 | −2.686E−04 |
| 16-th Order Coefficient | 0 | 0 | 0 | 3.724E−05 | 9.861 E−05 | 2.684E−04 | 4.219E−05 |
| 18-th Order Coefficient | 0 | 0 | 0 | −4.343E−06 | −9.736E−06 | −2.711 E−05 | −3.648E−06 |
| 20-th Order Coefficient | 0 | 0 | 0 | 2.157E−07 | 4.068E−07 | 1.162E−06 | 1.330E−07 |

Figure 5:
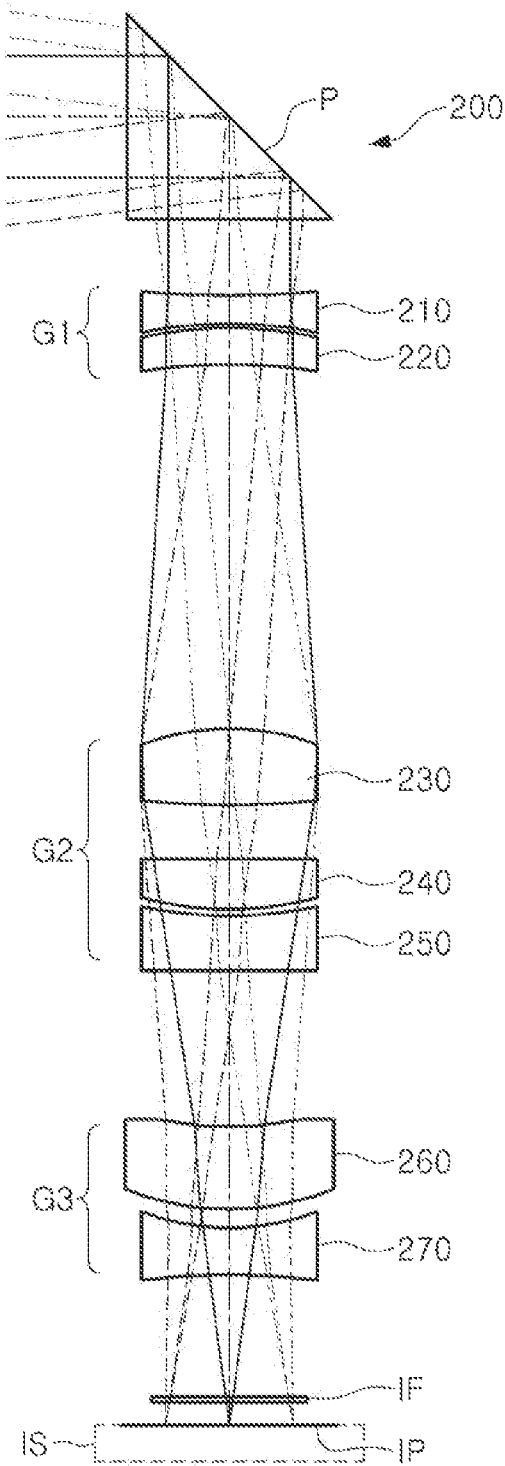
FIGS. 5 and 6 are views illustrating an optical imaging system according to a second example embodiment in the present disclosure.
Figure 6:
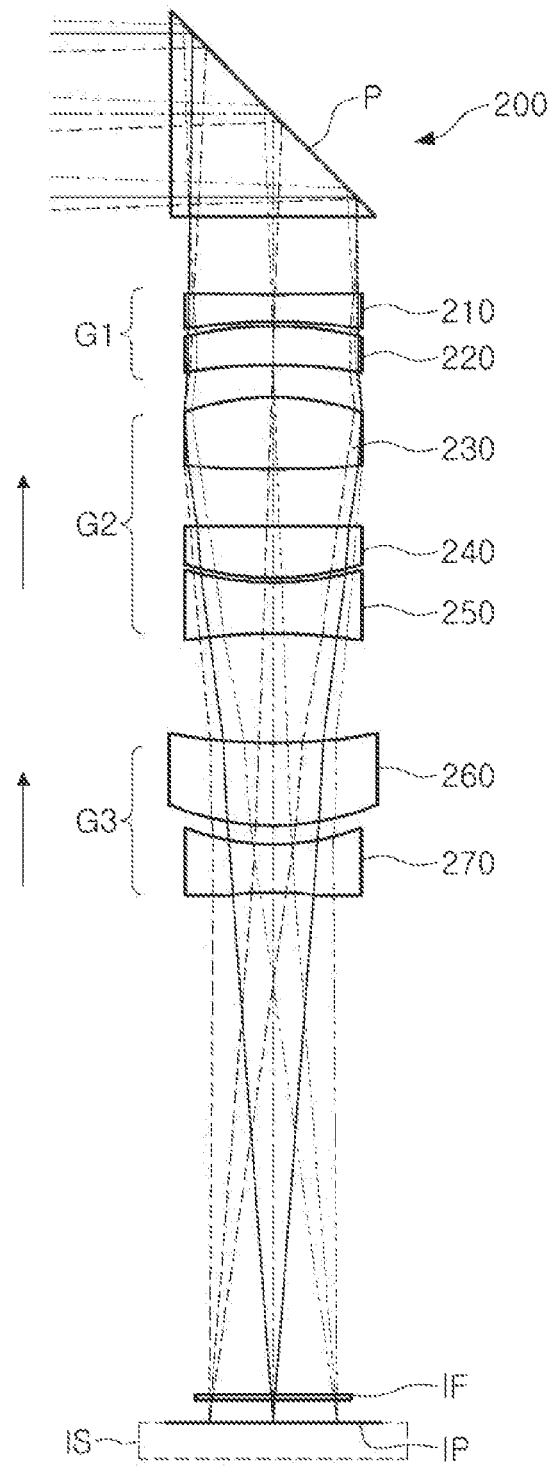

An optical imaging system according to a second example embodiment will be described with reference to FIGS. 5 and 6.

An optical imaging system 200 may include a plurality of lens groups. For example, the optical imaging system 200 may include a first lens group G1, a second lens group G2, and a third lens group G3. The optical imaging system 200 may include a plurality of lenses. For example, the optical imaging system 200 may include a first lens 210, a second lens 220, a third lens 230, a fourth lens 240, a fifth lens 250, a sixth lens 260, and a seventh lens 270 that are sequentially disposed from an object side.

The first lens group G1 may include two lenses. For example, the first lens group G1 may include the first lens 210 and the second lens 220. The first lens 210 may have negative refractive power, and an object-side surface thereof may be concave and an image-side surface thereof may be concave. The second lens 220 may have positive refractive power, and an object-side surface thereof may be convex and an image-side surface thereof may be concave.

The second lens group G2 may include three lenses. For example, the second lens group G2 may include the third lens 230, the fourth lens 240, and the fifth lens 250. The third lens 230 may have positive refractive power, and an object-side surface thereof may be convex and an image-side surface thereof may be convex. The fourth lens 240 may have positive refractive power, and an object-side surface thereof may be convex and an image-side surface thereof may be convex. The fifth lens 250 may have negative refractive power, and an object-side surface thereof may be concave and an image-side surface thereof may be convex.

The third lens group G3 may include two lenses. For example, the third lens group G3 may include the sixth lens 260 and the seventh lens 270. The sixth lens 260 may have positive refractive power, and an object-side surface thereof may be concave and an image-side surface thereof may be convex. The seventh lens 270 may have negative refractive power, and an object-side surface thereof may be concave and an image-side surface thereof may be concave.

Figure 7:
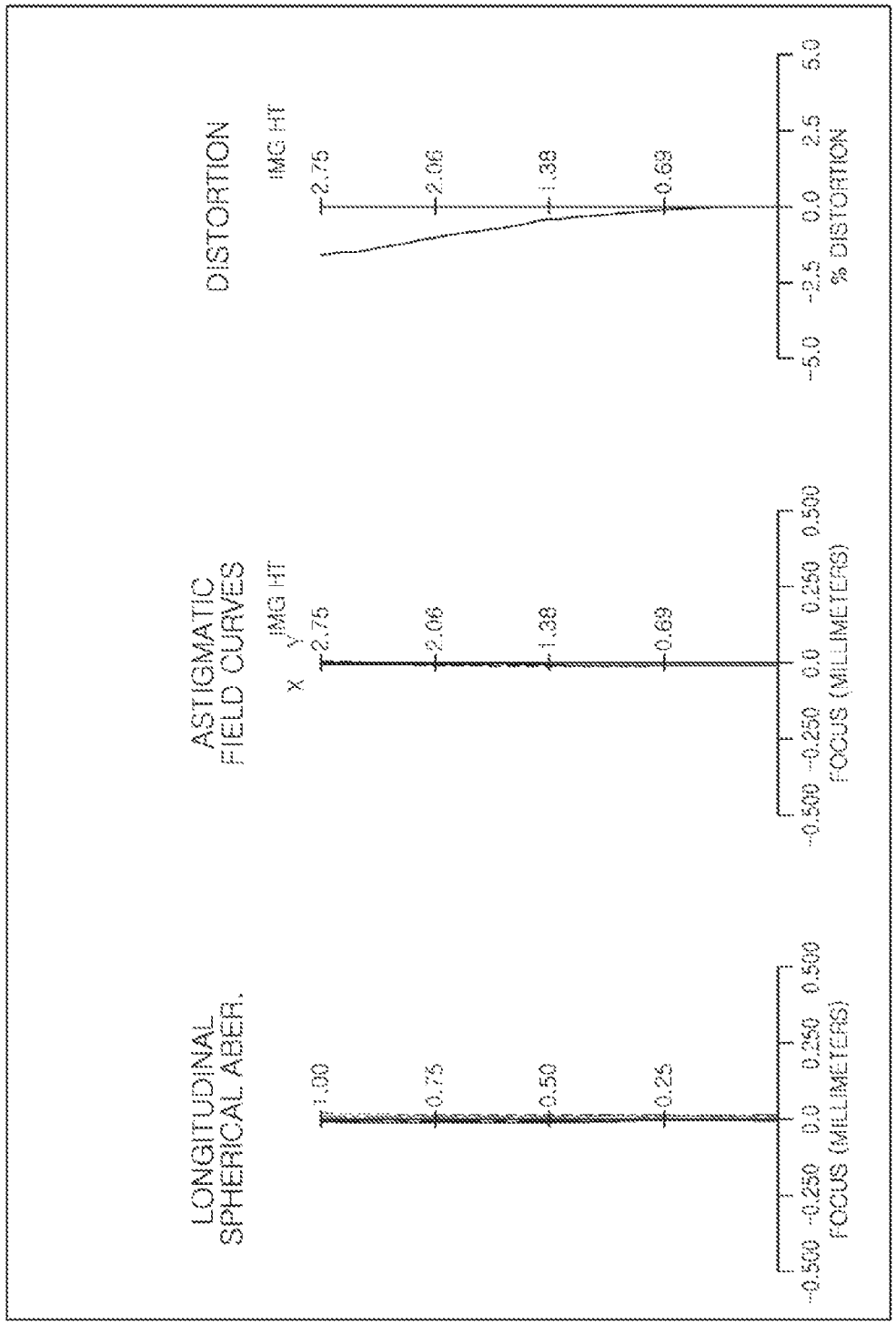
FIGS. 7 and 8 are graphs having curves representing aberration characteristics of the optical imaging system illustrated in FIGS. 5 and 6, respectively.
Figure 8:
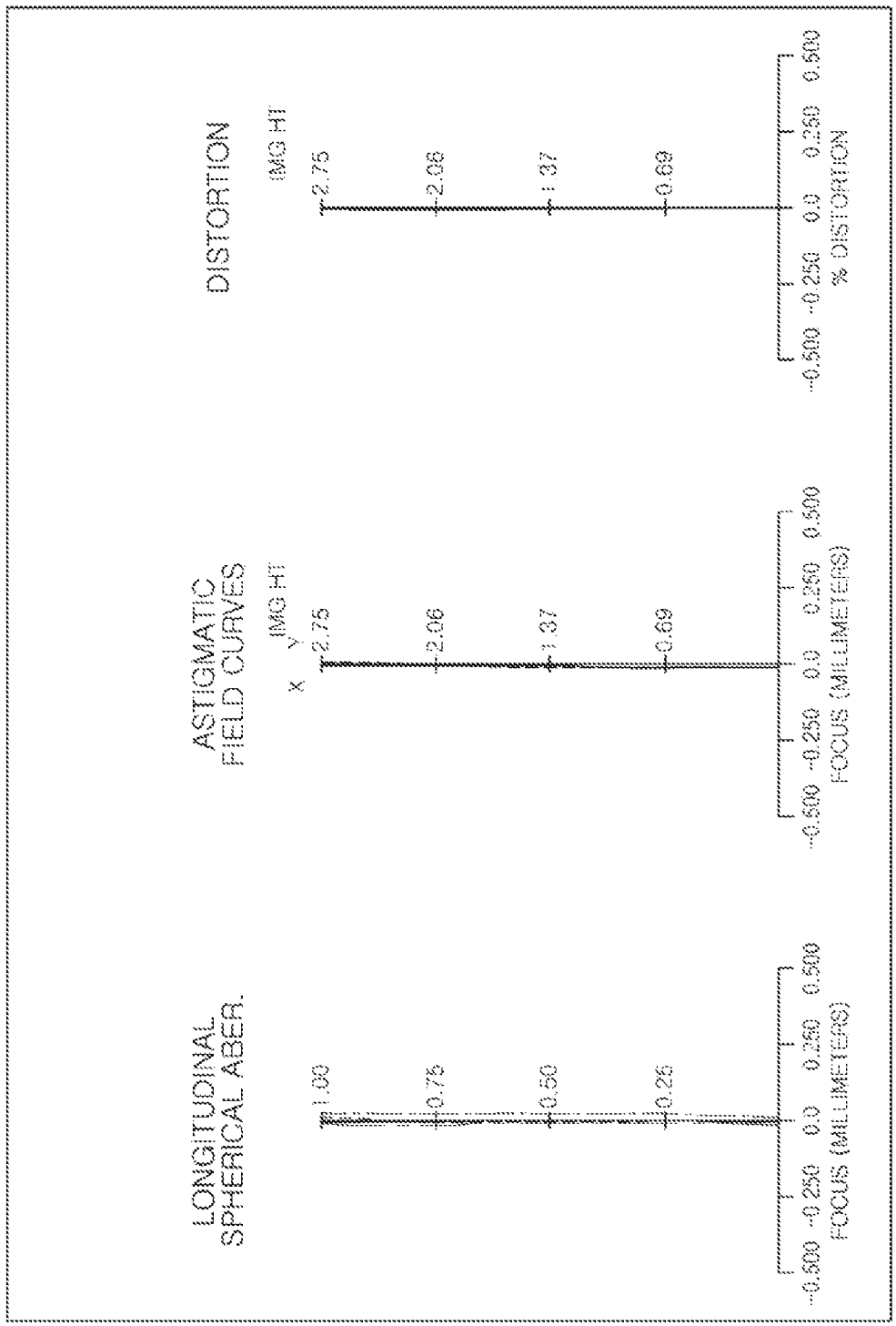

The lens groups G1, G2, and G3 may be moved along the optical axis direction so as to change focusing magnification of the optical imaging system. As an example, an optical axis distance between the first lens group G1 and the second lens group G2 and an optical axis distance between the second lens group G2 and the third lens group G3 may increase as the focal magnification of the optical imaging system decreases (see FIG. 5). As another example, the optical axis distance between the first lens group G1 and the second lens group G2 and the optical axis distance between the second lens group G2 and the third lens group G3 may decrease as the focal magnification of the optical imaging system increases (see FIG. 6). FIGS. 7 and 8 are graphs having curves representing aberration characteristics of the optical imaging system 200 according to the wide-angle end and the telephoto end, respectively.

The optical imaging system 200 may further include a prism P, a filter IF, and an imaging plane IP.

The prism P may be disposed on the object side of the first lens 210. The prism P may be configured to refract or reflect a path of light incident on the optical imaging system 200. The filter IF may be disposed in front of the imaging plane IP to block infrared rays included in the incident light. The imaging plane IP may provide a space in which light refracted by the first to seventh lenses 210 to 270 forms an image. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Table 3 represents characteristics of lenses of the optical imaging system according to the present example embodiment, and Table 4 represents aspherical values of the optical imaging system according to the present example embodiment.

TABLE 3

| Surface No. | Remark | Radius of Curvature | Thickness/Distance (Wide-Angle End) | Thickness/ Distance (Telephoto End) | Refractive Index | Abbe Number |
|---|---|---|---|---|---|---|
| 1 | Prism | Infinity | 2.5000 | 2.5000 | 1.717 | 29.5 |
| 2 | | Infinity | 2.5000 | 2.5000 | 1.717 | 29.5 |
| 3 | | Infinity | 1.8000 | 1.8000 | | |
| 4 | First Lens | −37.7569 | 0.7000 | 0.7000 | 1.544 | 56 |
| 5 | | 9.3967 | 0.0580 | 0.0580 | | |
| 6 | Second Lens | 8.8440 | 0.9500 | 0.9500 | 1.651 | 21.5 |
| 7 | | 13.0325 | 8.8550 | 0.7500 | | |
| 8 | Third Lens | 5.4635 | 1.8500 | 1.8500 | 1.497 | 81.5 |
| 9 | | −25.4456 | 1.3504 | 1.3504 | | |

TABLE 3-continued

| Surface No. | Remark | Radius of Curvature | Thickness/Distance (Wide-Angle End) | Thickness/Distance (Telephoto End) | Refractive Index | Abbe Number |
|---|---|---|---|---|---|---|
| 10 | Fourth Lens | 88.6058 | 1.2376 | 1.2376 | 1.544 | 56 |
| 11 | | −7.8311 | 0.0977 | 0.0977 | | |
| 12 | Fifth Lens | −7.9656 | 1.3500 | 1.3500 | 1.635 | 23.9 |
| 13 | | −56.4491 | 3.7915 | 2.5754 | | |
| 14 | Sixth Lens | −9.1411 | 2.0500 | 2.0500 | 1.651 | 21.5 |
| 15 | | −5.9525 | 0.4597 | 0.4597 | | |
| 16 | Seventh Lens | −8.4819 | 1.1572 | 1.1572 | 1.544 | 56 |
| 17 | | 11.7052 | 2.9389 | 12.2600 | | |
| 18 | Filter | Infinity | 0.1100 | 0.1100 | 1.516 | 64.1 |
| 19 | | Infinity | 0.5944 | 0.5944 | | |
| 20 | Imaging Plane | Infinity | 0.0000 | 0.0000 | | |

TABLE 4

| Surface No. | 4 | 5 | 6 | 7 | 8 | 9 | 10 |
|---|---|---|---|---|---|---|---|
| K | 0 | −0.6616868 | 0.24905783 | 0.38059083 | −0.0703386 | −72.936829 | 21.7557777 |
| 4-th Order Coefficient | 1.903E−04 | −1.232E−04 | 6.981E−04 | 9.117E−04 | 5.374E−04 | 6.811 E−04 | 7.081 E−04 |
| 6-th Order Coefficient | 3.512E−05 | 5.081 E−05 | 3.104E−05 | 5.868E−06 | 1.695E−05 | −1.298E−05 | 4.001 E−05 |
| 8-th Order Coefficient | −1.259E−07 | 3.195E−06 | −2.531 E−06 | −2.543E−06 | 2.759E−06 | −3.893E−08 | −3.989E−06 |
| 10-th Order Coefficient | −4.304E−08 | −2.194E−07 | −2.325E−07 | −4.493E−07 | −3.102E−08 | 2.454E−07 | −2.069E−06 |
| 12-th Order Coefficient | −6.802E−09 | −2.143E−08 | 1.693E−08 | 3.921E−08 | 3.168E−09 | −1.557E−08 | 1.975E−07 |
| 14-th Order Coefficient | 0 | 0 | 0 | 7.489E−10 | 0 | 0 | 0 |
| 16-th Order Coefficient | 0 | 0 | 0 | 0 | 0 | 0 | 0 |
| 18-th Order Coefficient | 0 | 0 | 0 | 0 | 0 | 0 | 0 |
| 20-th Order Coefficient | 0 | 0 | 0 | 0 | 0 | 0 | 0 |

| Surface No. | 11 | 12 | 13 | 14 | 15 | 16 | 17 |
|---|---|---|---|---|---|---|---|
| K | −4.7292087 | −6.2234119 | −92.999017 | −23.45726 | −13.039021 | −73.31389 | −9.2589979 |
| 4-th Order Coefficient | −2.333E−05 | −1.290E−03 | −2.321 E−03 | 1.681E−04 | 4.631 E−03 | 2.718E−02 | 1.172E−02 |
| 6-th Order Coefficient | 9.308E−05 | −1.809E−05 | −9.815E−05 | −1.416E−03 | −5.074E−03 | −1.634E−02 | −4.363E−03 |
| 8-th Order Coefficient | −2.936E−06 | 6.270E−06 | −9.063E−06 | 1.777E−03 | 6.546E−03 | 1.685E−02 | 3.842E−03 |
| 10-th Order Coefficient | −2.576E−06 | 5.824E−07 | 5.634E−06 | −1.567E−03 | −5.190E−03 | −1.266E−02 | −2.630E−03 |
| 12-th Order Coefficient | 1.940E−07 | −2.624E−07 | −7.127E−07 | 8.757E−04 | 2.533E−03 | 6.135E−03 | 1.125E−03 |
| 14-th Order Coefficient | 0 | 0 | −1.184E−08 | −3.049E−04 | −7.665E−04 | −1.882E−03 | −3.002E−04 |
| 16-th Order Coefficient | 0 | 0 | 0 | 6.421 E−05 | 1.398E−04 | 3.512E−04 | 4.844E−05 |
| 18-th Order Coefficient | 0 | 0 | 0 | −7.480E−06 | −1.403E−05 | −3.627E−05 | −4.314E−06 |
| 20-th Order Coefficient | 0 | 0 | 0 | 3.693E−07 | 5.935E−07 | 1.586E−06 | 1.625E−07 |

Figure 9:
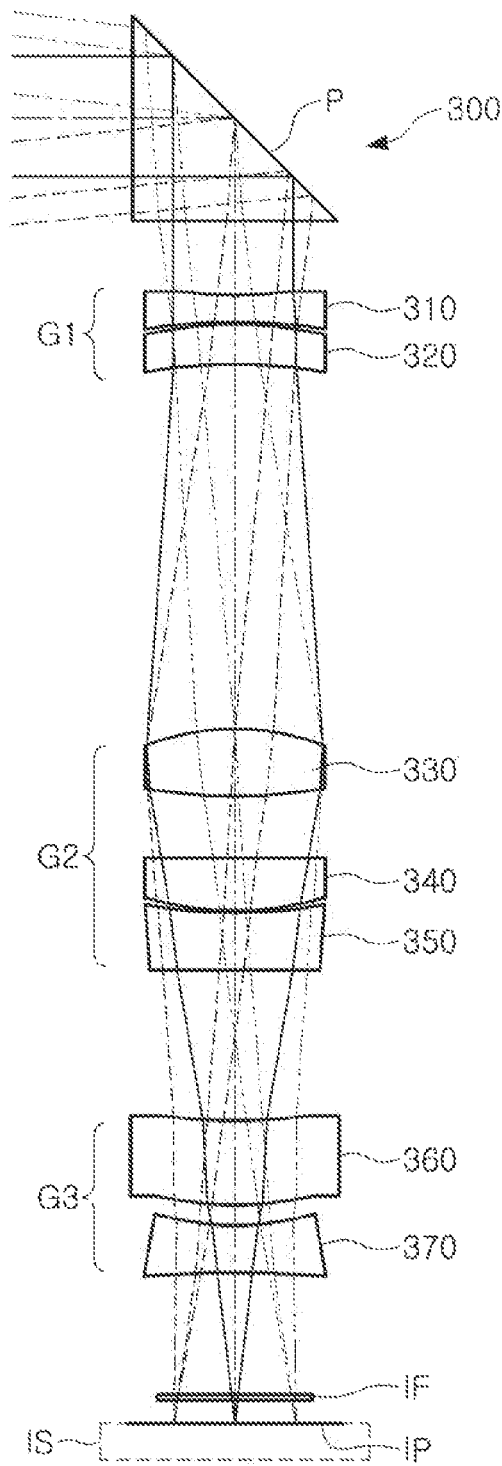
FIGS. 9 and 10 are views illustrating an optical imaging system according to a third example embodiment in the present disclosure.
Figure 10:
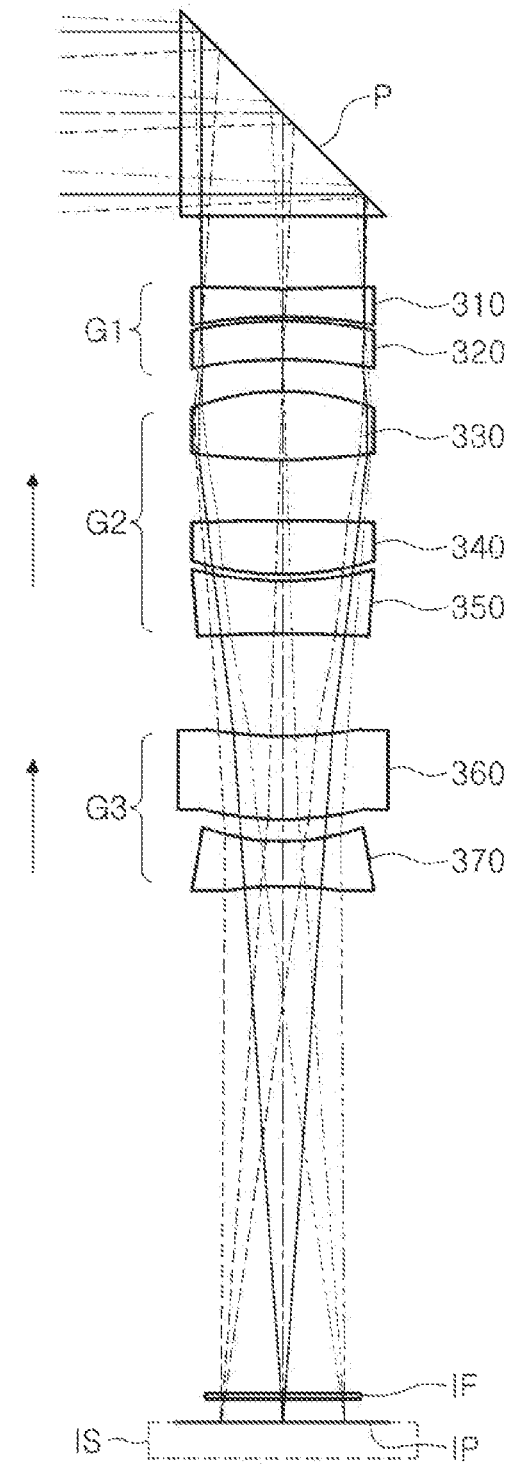

An optical imaging system according to a third example embodiment will be described with reference to FIGS. 9 and 10.

An optical imaging system 300 may include a plurality of lens groups. For example, the optical imaging system 300 may include a first lens group G1, a second lens group G2, and a third lens group G3. The optical imaging system 300 may include a plurality of lenses. For example, the optical imaging system 300 may include a first lens 310, a second lens 320, a third lens 330, a fourth lens 340, a fifth lens 350, a sixth lens 360, and a seventh lens 370 that are sequentially disposed from an object side.

The first lens group G1 may include two lenses. For example, the first lens group G1 may include the first lens 310 and the second lens 320. The first lens 310 may have negative refractive power, and an object-side surface thereof may be concave and an image-side surface thereof may be concave. The second lens 320 may have positive refractive power, and an object-side surface thereof may be convex and an image-side surface thereof may be concave.

The second lens group G2 may include three lenses. For example, the second lens group G2 may include the third lens 330, the fourth lens 340, and the fifth lens 350. The third lens 330 may have positive refractive power, and an object-side surface thereof may be convex and an image-side surface thereof may be convex. The fourth lens 340 may have positive refractive power, and an object-side surface thereof may be convex and an image-side surface thereof may be convex. The fifth lens 350 may have negative refractive power, and an object-side surface thereof may be concave and an image-side surface thereof may be convex.

The third lens group G3 may include two lenses. For example, the third lens group G3 may include the sixth lens 360 and the seventh lens 370. The sixth lens 360 may have positive refractive power, and an object-side surface thereof may be concave and an image-side surface thereof may be convex. The seventh lens 370 may have negative refractive power, and an object-side surface thereof may be concave and an image-side surface thereof may be concave.

Figure 11:
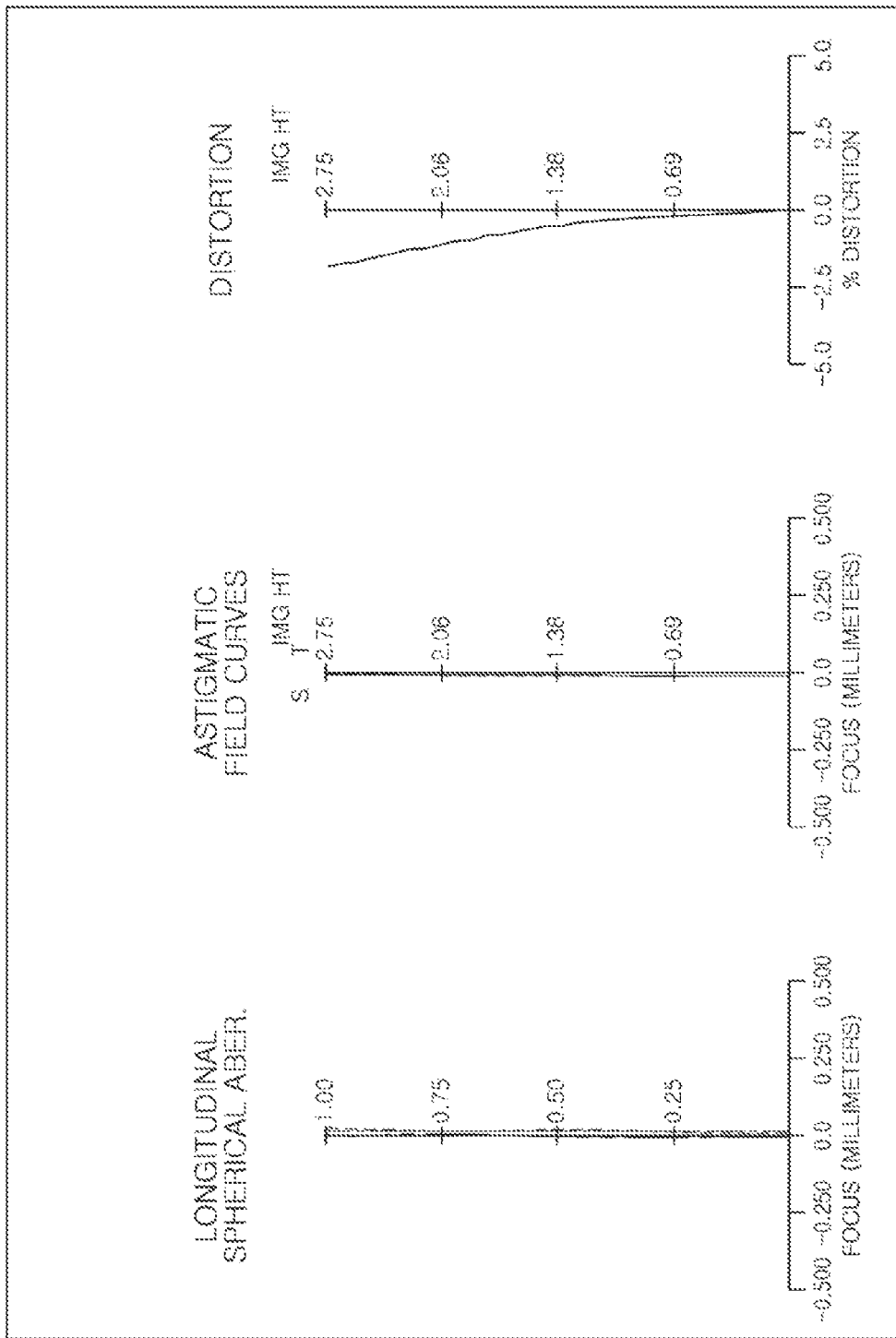
FIGS. 11 and 12 are graphs having curves representing aberration characteristics of the optical imaging system illustrated in FIGS. 9 and 10, respectively.
Figure 12:
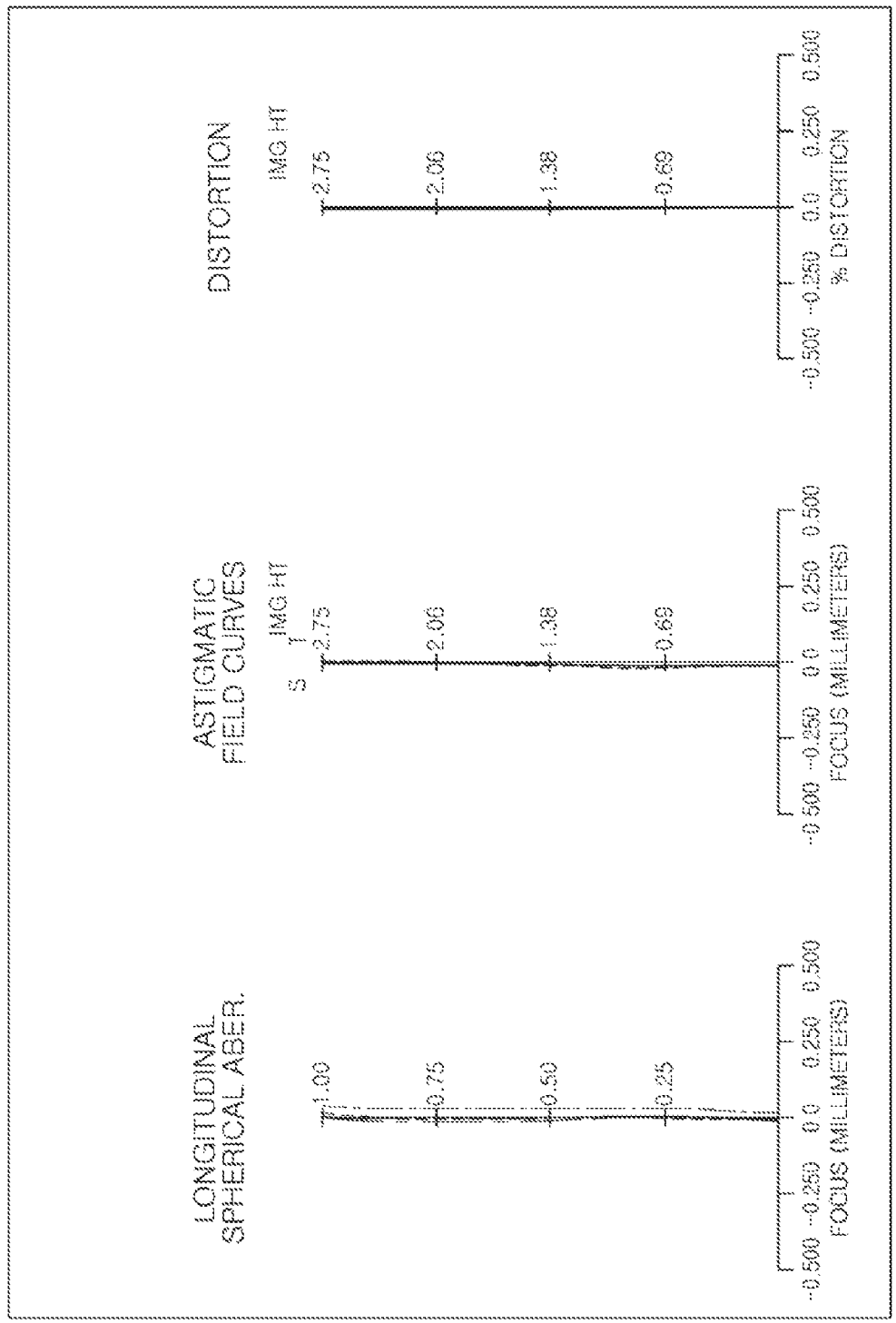

The lens groups G1, G2, and G3 may be moved along the optical axis direction so as to change focusing magnification of the optical imaging system. As an example, an optical axis distance between the first lens group G1 and the second lens group G2 and an optical axis distance between the second lens group G2 and the third lens group G3 may increase as the focal magnification of the optical imaging system decreases (see FIG. 9). As another example, the optical axis distance between the first lens group G1 and the second lens group G2 and the optical axis distance between the second lens group G2 and the third lens group G3 may decrease as the focal magnification of the optical imaging system increases (see FIG. 10). FIGS. 11 and 12 are graphs having curves representing aberration characteristics of the optical imaging system 300 according to the wide-angle end and the telephoto end, respectively.

The optical imaging system 300 may further include a prism P, a filter IF, and an imaging plane IP.

The prism P may be disposed on the object side of the first lens 310. The prism P may be configured to refract or reflect a path of light incident on the optical imaging system 300. The filter IF may be disposed in front of the imaging plane IP to block infrared rays included in the incident light. The imaging plane IP may provide a space in which light refracted by the first to seventh lenses 310 to 370 forms an image. The imaging plane IP may be formed on an image sensor IS. For example, the imaging plane IP may be formed on one surface of the image sensor IS. However, the imaging plane IP is not necessarily formed on the image sensor IS. For example, the imaging plane IP may be formed on any type of member or device capable of converging optical signals, such as an image film.

Table 5 represents characteristics of lenses of the optical imaging system according to the present example embodiment, and Table 6 represents aspherical values of the optical imaging system according to the present example embodiment.

TABLE 5

| Surface No. | Remark | Radius of Curvature | Thickness/Distance (Wide-Angle End) | Thickness/Distance (Telephoto End) | Refractive Index | Abbe Number |
| --- | --- | --- | --- | --- | --- | --- |
| 1 | Prism | Infinity | 2.5000 | 2.5000 | 1.717 | 29.5 |
| 2 | | Infinity | 2.5000 | 2.5000 | 1.717 | 29.5 |
| 3 | | Infinity | 1.8000 | 1.8000 | | |
| 4 | First Lens | −31.5681 | 0.7000 | 0.7000 | 1.544 | 56 |
| 5 | | 9.7702 | 0.0580 | 0.0580 | | |
| 6 | Second Lens | 9.1247 | 0.9500 | 0.9500 | 1.651 | 21.5 |
| 7 | | 13.8566 | 8.8512 | 0.7500 | | |
| 8 | Third Lens | 5.4927 | 1.6646 | 1.6646 | 1.497 | 81.5 |
| 9 | | −30.1915 | 1.5004 | 1.5004 | | |
| 10 | Fourth Lens | 53.3891 | 1.3005 | 1.3005 | 1.544 | 56 |
| 11 | | −7.8731 | 0.0872 | 0.0872 | | |
| 12 | Fifth Lens | −8.3579 | 1.3500 | 1.3500 | 1.635 | 23.9 |
| 13 | | −87.5721 | 3.7007 | 2.4806 | | |
| 14 | Sixth Lens | −10.5630 | 2.0500 | 2.0500 | 1.671 | 19.2 |
| 15 | | −6.9730 | 0.5192 | 0.5192 | | |
| 16 | Seventh Lens | −7.9492 | 1.1455 | 1.1455 | 1.544 | 56 |
| 17 | | 14.3260 | 2.9387 | 12.2600 | | |
| 18 | Filter | Infinity | 0.1100 | 0.1100 | 1.516 | 64.1 |
| 19 | | Infinity | 0.6020 | 0.6020 | | |
| 20 | Imaging Plane | Infinity | 0.0000 | 0.0000 | | |

TABLE 6

| Surface No. | 4 | 5 | 6 | 7 | 8 | 9 | 10 |
|---|---|---|---|---|---|---|---|
| K | 0 | −0.502731 | 0.40220469 | 1.40823564 | −0.1057863 | −84.936771 | −18.7638 |
| 4-th Order Coefficient | 9.575E−05 | −1.464E−04 | 6.677E−04 | 8.493E−04 | 5.922E−04 | 6.882E−04 | 7.235E−04 |
| 6-th Order Coefficient | 3.577E−05 | 4.836E−05 | 2.796E−05 | 9.716E−06 | 1.481E−05 | −1.084E−05 | 3.836E−05 |
| 8-th Order Coefficient | 4.022E−07 | 2.751E−06 | −2.310E−06 | −2.448E−06 | 2.263E−06 | −9.293E−07 | −3.317E−06 |
| 10-th Order Coefficient | −1.062E−07 | −1.676E−07 | −2.391E−07 | −4.557E−07 | −2.999E−08 | 1.136E−07 | −2.153E−06 |
| 12-th Order Coefficient | −1.681E−09 | −1.478E−08 | 1.817E−08 | 3.854E−08 | −4.115E−09 | −1.122E−08 | 1.912E−07 |
| 14-th Order Coefficient | 0 | 0 | 0 | 4.309E−10 | 0 | 0 | 0 |
| 16-th Order Coefficient | 0 | 0 | 0 | 0 | 0 | 0 | 0 |
| 18-th Order Coefficient | 0 | 0 | 0 | 0 | 0 | 0 | 0 |
| 20-th Order Coefficient | 0 | 0 | 0 | 0 | 0 | 0 | 0 |

| Surface No. | 11 | 12 | 13 | 14 | 15 | 16 | 17 |
|---|---|---|---|---|---|---|---|
| K | −4.960678 | −6.3434787 | −99 | −26.798444 | −16.712891 | −75.844628 | −5.9238345 |
| 4-th Order Coefficient | −5.437E−05 | −1.305E−03 | −2.244E−03 | −5.182E−04 | 2.823E−03 | 2.829E−02 | 1.011E−02 |
| 6-th Order Coefficient | 9.556E−05 | −1.834E−05 | −9.528E−05 | −1.420E−03 | −4.119E−03 | −1.814E−02 | −3.887E−03 |
| 8-th Order Coefficient | −1.587E−06 | 5.736E−06 | −9.451E−06 | 2.024E−03 | 5.753E−03 | 1.798E−02 | 3.717E−03 |
| 10-th Order Coefficient | −2.300E−06 | 4.443E−07 | 5.064E−06 | −1.769E−03 | −4.618E−03 | −1.304E−02 | −2.569E−03 |
| 12-th Order Coefficient | 1.701E−07 | −1.820E−07 | −7.693E−07 | 9.576E−04 | 2.250E−03 | 6.167E−03 | 1.089E−03 |
| 14-th Order Coefficient | 0 | 0 | 1.874E−08 | −3.240E−04 | −6.799E−04 | −1.861E−03 | −2.856E−04 |
| 16-th Order Coefficient | 0 | 0 | 0 | 6.680E−05 | 1.244E−04 | 3.439E−04 | 4.513E−05 |
| 18-th Order Coefficient | 0 | 0 | 0 | −7.680E−06 | −1.260E−05 | −3.537E−05 | −3.920E−06 |
| 20-th Order Coefficient | 0 | 0 | 0 | 3.776E−07 | 5.414E−07 | 1.547E−06 | 1.431E−07 |

The focal lengths of the lenses constituting the optical imaging system may be determined within a predetermined range. For example, the focal length of the first lens is in the range of −15.0 to −10.0 mm, the focal length of the second lens is in the range of 30 to 46 mm, the focal length of the third lens is in the range of 6.0 to 12.0 mm, the focal length of the fourth lens is in the range of 10.0 to 15.0 mm, the focal length of the fifth lens is in the range of −18.0 to −12.0 mm, the focal length of the sixth lens is in the range of 16.0 to 30.0 mm, and the focal length of the seventh lens is in the range of −12.0 to −6.0 mm.

Table 7 represents optical characteristics of the optical imaging systems according to the first to third example embodiments. For reference, BFL, TTL, and PTTL are reference values for a first position.

TABLE 7

| Remark | First Example Embodiment | Second Example Embodiment | Third Example Embodiment |
|---|---|---|---|
| f1 | −13.78 | −13.6961 | −13.57123 |
| f2 | 39.44 | 38.366929 | 37.611329 |
| f3 | 9.12 | 9.204858 | 9.468289 |
| f4 | 13.59 | 13.225958 | 12.649944 |

TABLE 7-continued

| | | | | | |
|---|---|---|---|---|---|
| f5 | −14.49 | | −14.61183 | | −14.49534 |
| f6 | 20.77 | | 20.661809 | | 24.527815 |
| f7 | −8.78 | | −8.82065 | | −9.350541 |

| | Wide-Angle End | Telephoto End | Wide-Angle End | Telephoto End | Wide-Angle End | Telephoto End |
|---|---|---|---|---|---|---|
| PTTL | 31.8974 | 31.8974 | 31.8504 | 31.8504 | 31.8279 | 31.8279 |
| TTL | 27.5974 | 27.5974 | 27.5504 | 27.5504 | 27.5279 | 27.5279 |
| BFL | 3.6474 | 12.9627 | 3.6433 | 12.9644 | 3.6507 | 12.9720 |
| f | 11.4000 | 27.6000 | 11.4000 | 27.6000 | 11.4000 | 27.6000 |
| f number | 3.1000 | 5.5000 | 3.1000 | 5.5000 | 3.1000 | 5.5000 |
| IMG_HT | 2.7500 | 2.7500 | 2.7500 | 2.7500 | 2.7500 | 2.7500 |

Tables 8 to 10 represent values of Conditional Expressions of the optical imaging systems according to the first to third example embodiments.

TABLE 8

| Conditional Expression | First Example Embodiment | Second Example Embodiment | Third Example Embodiment |
|---|---|---|---|
| fw/f1 | −0.82729 | −0.83235 | −0.84001 |
| fw/f2 | 0.28905 | 0.29713 | 0.30310 |
| fw/f3 | 1.25000 | 1.23848 | 1.20402 |
| fw/f4 | 0.83885 | 0.86194 | 0.90119 |
| fw/f5 | −0.78675 | −0.78019 | −0.78646 |
| fw/f6 | 0.54887 | 0.55174 | 0.46478 |
| fw/f7 | −1.29841 | −1.29242 | −1.21918 |
| ft/fw | 2.42105 | 2.42105 | 2.42105 |

TABLE 9

| Conditional Expression | First Example Embodiment | Second Example Embodiment | Third Example Embodiment |
|---|---|---|---|
| ft/f1 | −2.00290 | −2.01517 | −2.03371 |
| ft/f2 | 0.69980 | 0.71937 | 0.73382 |
| ft/f3 | 3.02632 | 2.99842 | 2.91499 |
| ft/f4 | 2.03091 | 2.08681 | 2.18183 |
| ft/f5 | −1.90476 | −1.88888 | −1.90406 |
| ft/f6 | 1.32884 | 1.33580 | 1.12525 |
| ft/f7 | −3.14351 | −3.12902 | −2.95170 |

TABLE 10

| Conditional Expression | First Example Embodiment | Second Example Embodiment | Third Example Embodiment |
|---|---|---|---|
| Nd3 | 1.49700 | 1.49700 | 1.49700 |
| Nd2-Nd3 | 0.15400 | 0.15400 | 0.15400 |
| Nd6-Nd5 | 0.01600 | 0.01600 | 0.03600 |
| Nd6-Nd7 | 0.10700 | 0.10700 | 0.12700 |
| TTL/fw | 2.42082 | 2.41670 | 2.41473 |
| TTL/ft | 0.99991 | 0.99820 | 0.99739 |
| TTL/IMG_HT | 10.03541 | 10.01833 | 10.01015 |
| fw/IMG_HT | 4.14545 | 4.14545 | 4.14545 |
| ft/IMG_HT | 10.03636 | 10.03636 | 10.03636 |
| PTTL/fw | 2.79802 | 2.79390 | 2.79192 |
| PTTL/ft | 1.15570 | 1.15400 | 1.15319 |

Figure 13:
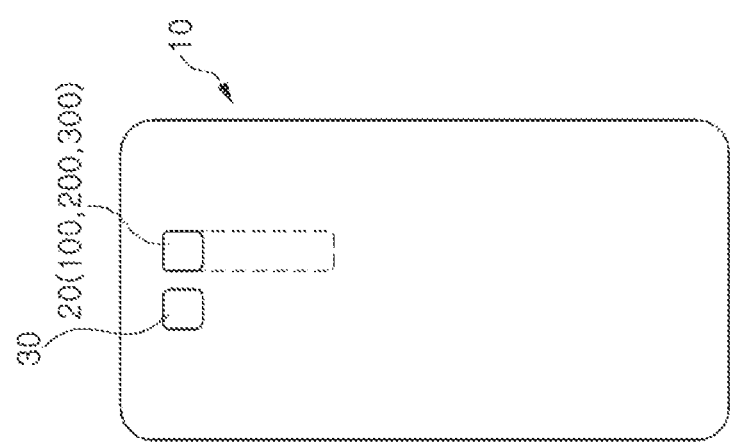
FIGS. 13, 14, and 15 are rear views of portable terminals having one or more of the optical imaging systems according to the first to third example embodiments.

An optical imaging system 20 according to the present disclosure may be mounted on a portable terminal. For example, one or more of the optical imaging systems according to the above-described example embodiments may be mounted on a rear or front surface of a portable terminal 10 as illustrated in FIGS. 13 through 15.

The portable terminal 10 may include a plurality of optical imaging systems 20, 30, 40, and 50. As an example, the portable terminal 10 may include an optical imaging system 20 for capturing a long distance and an optical imaging system 30 for capturing a short distance, as illustrated in FIG. 13.

Figure 14:
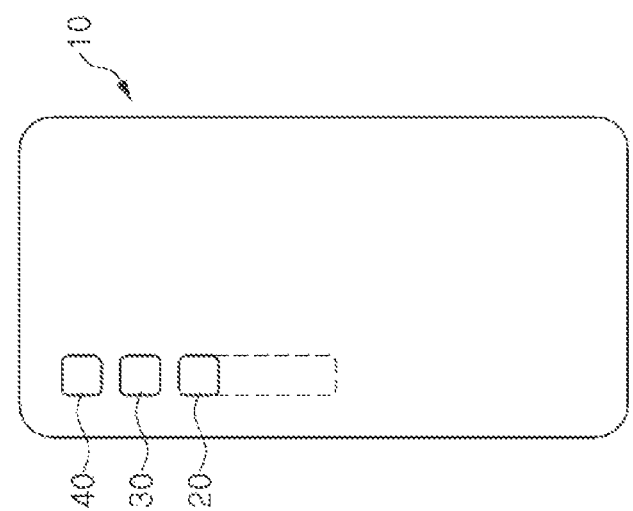
Figure 15:
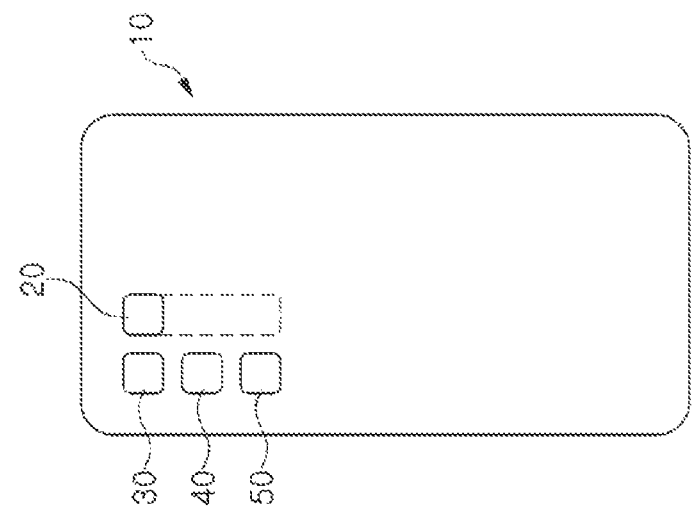

As another example, the portable terminal 10 may include one optical imaging system 20 for capturing a long distance and two optical imaging systems 30 and 40 for capturing a short distance, as illustrated in FIG. 14. The optical imaging systems 20, 30, and 40 may be disposed on the rear surface of the portable terminal 10 at a predetermined interval. For example, the optical imaging systems 20, 30, and 40 may be disposed at intervals along a length direction or a width direction of the portable terminal 10. The optical imaging systems 20, 30, and 40 may be configured to exhibit different optical characteristics. For example, the first optical imaging system 20 may have a longer focal length than the second optical imaging system 30 and the third optical imaging system 40. The third optical imaging system 40 may have a wider angle of view than the first optical imaging system 20 and the second optical imaging system 30. The second optical imaging system 30 may have a longer focal length than the third optical imaging system 40 and a wider angle of view than the first optical imaging system 20. As another example, the portable terminal 10 may include an optical imaging system 20 for capturing a long distance and optical imaging systems 30, 40, and 50 having different focal lengths. The arrangement of the optical systems 20, 30, 40, and 50 may be variously modified.

As set forth above, according to the example embodiments in the present disclosure, the optical imaging system capable of having a long focal length and being mounted in a thinned small terminal may be implemented.

Further, according to the present disclosure, the optical imaging system capable of continuously adjusting focusing magnification may be implemented.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, fifth lens, a sixth lens, and a seventh lens,
wherein the first to seventh lenses are sequentially disposed from an object side to an imaging plane,
wherein the second lens, the fourth lens, and the sixth lens have positive refractive power, respectively,
wherein a thickness along an optical axis of the fifth lens is greater than a thickness along an optical axis of the first lens,
wherein the optical imaging system satisfies $-1.2<fw/f5<-0.6$, where fw is a focal length of the optical imaging system at a wide-angle end and f5 is a focal length of the fifth lens,
wherein the optical imaging system satisfies $0.1<Nd2-Nd3<0.2$, where Nd2 is a refractive index of the second lens and Nd3 is a refractive index of the third lens, and
wherein the optical imaging system comprises no more than three lens groups and no more than seven lenses.

2. The optical imaging system of claim 1, wherein the third lens has a convex object-side surface.

3. The optical imaging system of claim 1, wherein the fourth lens has a convex object-side surface.

4. The optical imaging system of claim 1, wherein the fourth lens has a convex image-side surface.

5. The optical imaging system of claim 1, wherein the fifth lens has a concave object-side surface.

6. The optical imaging system of claim 1, wherein the sixth lens has a concave object-side surface.

7. The optical imaging system of claim 1, wherein the sixth lens has a convex image-side surface.

8. The optical imaging system of claim 1, wherein the seventh lens has a concave image-side surface.

9. The optical imaging system of claim 1, wherein the fifth lens has negative refractive power.

10. The optical imaging system of claim 1, wherein the seventh lens has negative refractive power.

11. An optical imaging system comprising:
a first lens having a refractive power;
a second lens having positive refractive power;
a third lens having a convex object-side surface;
a fourth lens having positive refractive power and a convex object-side surface;
a fifth lens having negative refractive power;
a sixth lens having positive refractive power and a concave object-side surface; and
a seventh lens having negative refractive power,
wherein the first to seventh lenses are sequentially disposed from an object side to an imaging plane,
wherein a thickness along an optical axis of the fifth lens is greater than a thickness along an optical axis of the first lens,
wherein the optical imaging system satisfies $0.1<Nd2-Nd3<0.2$, where Nd2 is a refractive index of the second lens and Nd3 is a refractive index of the third lens, and
wherein the optical imaging system comprises no more than three lens groups and no more than seven lenses.

12. The optical imaging system of claim 11, wherein the optical imaging system satisfies $0.1<fw/f2<0.4$, where fw is a focal length of the optical imaging system at a wide-angle end and f2 is a focal length of the second lens.

13. The optical imaging system of claim 11, wherein the optical imaging system satisfies $0.2<fw/f6<0.6$, where fw is a focal length of the optical imaging system at a wide-angle end and f6 is a focal length of the sixth lens.

14. The optical imaging system of claim 11, wherein the optical imaging system satisfies $-2.0<fw/f7<-1.0$, where fw is a focal length of the optical imaging system at a wide-angle end and f7 is a focal length of the seventh lens.

15. The optical imaging system of claim 11, wherein the optical imaging system satisfies $0.3<ft/f2<1.0$, where ft is a focal length of the optical imaging system at a telephoto end and f2 is a focal length of the second lens.

16. The optical imaging system of claim 11, wherein the optical imaging system satisfies $1.0<ft/f4<4.0$, where ft is a focal length of the optical imaging system at a telephoto end and f4 is a focal length of the fourth lens.

17. The optical imaging system of claim 11, wherein the optical imaging system satisfies $-3.0<ft/f5<-1.0$, where ft is a focal length of the optical imaging system at a telephoto end and f5 is a focal length of the fifth lens.

18. The optical imaging system of claim 11, wherein the optical imaging system satisfies $0.8<TTL/ft<1.2$, where TTL is a distance from an object-side surface of the first lens to the imaging plane and ft is a focal length of the optical imaging system at a telephoto end.

* * * * *